W. P. & S. G. THOMSON.
RAIL JOINT.
APPLICATION FILED OCT. 30, 1908.
968,500.
Patented Aug. 23, 1910.
2 SHEETS—SHEET 1.
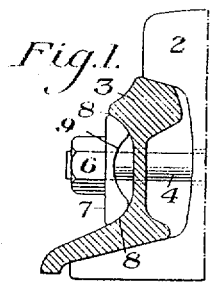 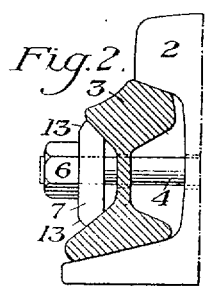 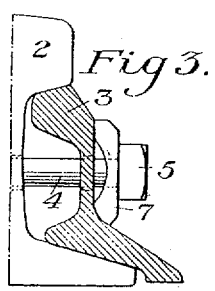
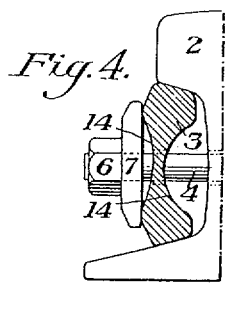 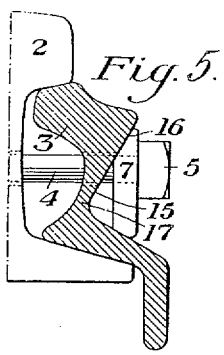 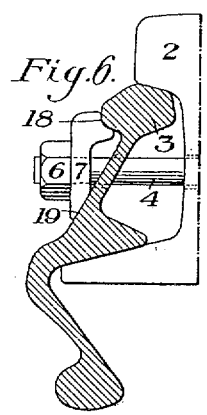 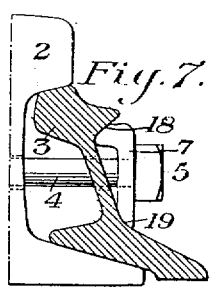
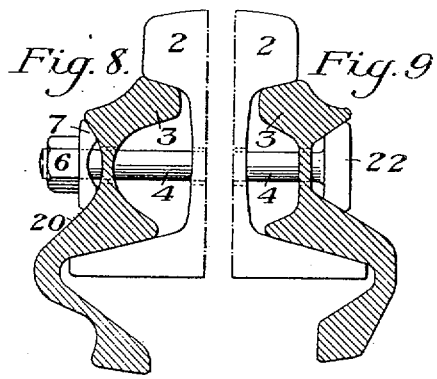 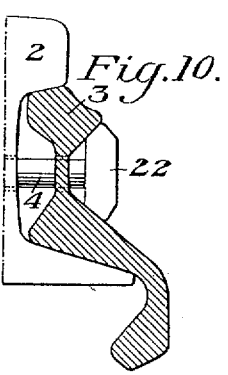
WITNESSES
R A Balderson
INVENTORS
Wm P. Thomson
S. G. Thomson
by Bakewell, Byrnes & Parmelee
their Attys

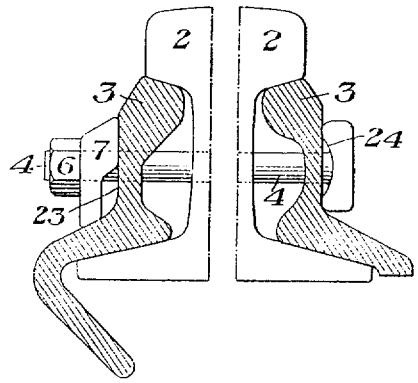
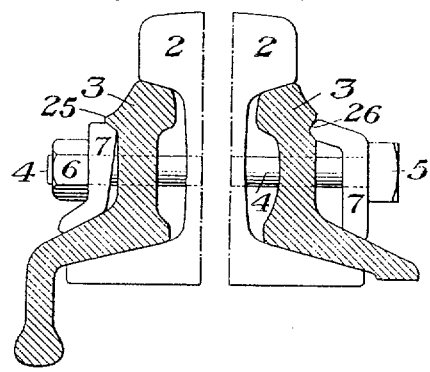
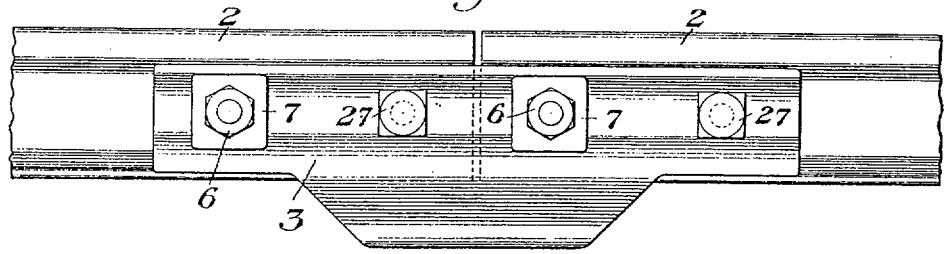
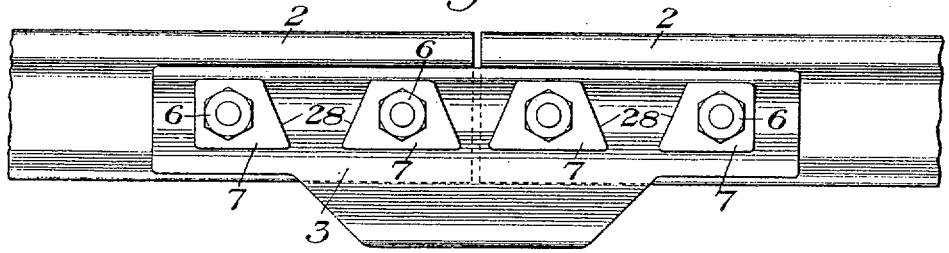

UNITED STATES PATENT OFFICE.

WILLIAM P. THOMSON AND SAMUEL G. THOMSON, OF PHILADELPHIA, PENNSYLVANIA, ASSIGNORS TO THOMSON-THOMSON COMPANY, OF PHILADELPHIA, PENNSYLVANIA, A PARTNERSHIP.

RAIL-JOINT.

968,500.  Specification of Letters Patent.  Patented Aug. 23, 1910.

Application filed October 30, 1908. Serial No. 460,212.

*To all whom it may concern:*

Be it known that we, WILLIAM P. THOMSON and SAMUEL G. THOMSON, both residents of Philadelphia, in the county of Philadelphia and State of Pennsylvania, have invented a new and useful Improvement in Rail-Joints, of which the following is a full, clear, and exact description, reference being had to the accompanying drawings, forming part of this specification, in which—

Figures 1 to 14, inclusive, are sectional views showing different forms of our invention; and Figs. 15 and 16 are side elevations showing other forms of the same.

Our invention has relation to rail joints, and is designed to provide a joint which will permit the use of splice bars having very light upright webs, and which will afford the lightest and stiffest joint which can be made with a given amount of metal, and which will possess other advantages hereinafter described and pointed out.

In accordance with our invention, we provide a rail joint having a bridge plate bearing against the outer face of the splice bar and adapted to relieve the web of the splice bars from all direct horizontal pulling strains and to transmit these strains to the head and foot portions of the bar which bear directly under the head and upon the foot of the rail respectively. This bridge plate may consist either of a separate plate of the proper character, or it may be provided by a special design of the heads of the joint bolts, as will hereinafter appear.

The precise nature of our invention will be best understood by reference to the accompanying drawings, in which we have shown a number of different embodiments of the invention, and which will now be described, it being premised, however, that these forms are illustrative only and that the bridge plate may, in accordance with our invention, assume various other designs. In all of the figures of the drawings, we have shown our improved joint as applied to rails of ordinary T-section, but the joint is also applicable to rails of other sections.

In these drawings, the numeral 2 wherever seen designates one of the rails, 3 a splice bar, and 4 the joint bolts, 5 the heads thereof, and 6 the securing nuts.

7 wherever seen designates our improved bridge plate.

In the construction shown in Fig. 1, the bridge plate 7 is provided with convex upper and lower bearing edges 8, which bear respectively against the under side of the head of the splice bar and against the base flange thereof, and which has a concave inner face 9 which stands free from the thin vertical web of the splice bar.

We desire it to be understood that in general any of the forms of bridge plates herein shown and described are adapted for use with splice bars which have extensions of any kind below the rail base, and also with splice bars which do not have such extensions.

The bridge plate shown in Fig. 2 is beveled in opposite directions upon its upper and lower edges, as shown at 13, the inner beveled faces fitting the correspondingly beveled surfaces of the splice bar head and base, and the bridge piece spaced at a distance from the vertical web of the bar.

Fig. 3 shows a splice bar having about the normal contour of the ordinary angle bar, except that the inner portion of its web is hollowed out to a greater extent than usual, thereby giving a thinner web. The bridge plate fits against the vertical outer face of the bar, this bearing face being concave so as to stand free from the middle portion of the thin web.

Fig. 4 shows a form of splice bar which is seated entirely between the head and base flanges of the rail with its inner and outer faces concave as shown at 14, forming a thin central web, the bridge plate having a flat inner face fitting against the outer face of the splice bar.

Fig. 5 shows a splice bar having a downwardly and inwardly extending outer face 15, with the bridge plate provided with a beveled upper inner face 16 fitting against the inclined outer face of the bar. The lower portion of the bridge plate stands free from the narrow or neck portion 17 of the bar which joins its upper and lower members.

Figs. 6 and 7 show splice bars having their webs inclined downwardly and outwardly, with the bridge plates in the form of an angle spanning the thin web of the bars, the upper inner edges 18 of the bridge plates fitting underneath the heads of the splice bars, and their lower beveled edges 19 fitting the outer inclined faces of the bars.

Fig. 8 shows a splice bar formed with a continuously curved or concave bolting face 20 with the bridge plate 7 fitting within the concavity of the face above and below the bolt.

In the construction shown in Figs. 9 and 10, the head of the bolt is shaped as shown at 22 to perform the function of the bridge plate, the bars having outer or bolting faces of substantially the same form shown in Fig. 2.

Fig. 11 shows a splice bar having a flat outer face 23 similar to that of the ordinary angle bar, with a bridge plate fitting flatly against such face down to the bolt hole, and its lower portion standing free from the thin web of the splice bar below the bolt.

Fig. 12 shows a splice bar having a flat outer face, and with the head of the bolt shaped to form the bridging means, the inner face of the bolt head being concaved as indicated at 24 and bearing upon the splice bar above and below the center of the bolt.

Fig. 13 shows a splice bar having a small longitudinal rib 25 at the outer side of its head portion, the upper inner edge of the bridge plate fitting underneath this rib and clamped by the nut against the foot portion of the splice bar to prevent kicking up. In this form the bridge plate acts as a strut, which is an additional feature to the function which it has in spanning and distributing the longitudinal strains around the web of the bar.

Fig. 14 shows an ordinary angle bar with a longitudinal groove 26 along its upper portion, into which the beveled inwardly bent upper edge of the bridge plate fits, the lower end of the bridge plate fitting against the top member of the foot in order to act as a strut in the same manner as the plate shown in Fig. 13.

Fig. 15 shows a side elevation, in which the heads 27 of two of the joint bolts are shown as of ordinary character, the other two bolts having bridge plates underneath the nuts, it being understood that either all or a portion of the bolts may be provided with bridge plates of any of the forms described.

Fig. 16 shows a side elevation of the joint, in which the bridge plates are sheared off at an angle at their ends, as shown at 28, this being for the purpose of providing a longer clamping face at the foot portion of the bar than underneath the head, in order to prevent any tendency of the foot member to kick out, as might tend to occur with types of bars having long thin outwardly extending foot members such as shown in Figs. 1, 5, 11, 13 and 14. Such plates as are symmetrical with reference to a longitudinal axis can be readily sheared with their ends at an angle without any waste of metal.

As is well known, the types of splice bars now generally in use have a comparatively heavy web member in order to resist the lateral strains of the bolts which pull upon them midway between their bearings located at their upper and lower extremities. It will be seen that our improvement permits a considerable part of this metal to be removed from the middle web portion of the bar where it is least valuable for stiffness, and allows a splice bar to be constructed which is similar in shape and proportions to the rail, thereby affording the lightest and stiffest joint possible with a given amount of metal. Tests have proven that very little metal can be removed from the webs of the present splice bars without causing them to bend inwardly at the bolt holes and to bend along the center line of the bolts, thus throwing the fitting faces out of contact and causing the joint to lose its stiffness. By means of a bridge plate such as herein described, the web of the bar is relieved from all direct horizontal pulling strains, and these strains are transmitted in substantially horizontal lines to the head and foot of the bar, which in turn bear directly under the head and on the top of the foot of the rail respectively. Therefore, it is possible to very considerably reduce the web portion of the bars, since the bridge plates will span the portions which have little lateral resistance and transmit the strains around it through solid metal to the rail bearing faces. These strains need only be transmitted immediately at the bolt holes, and therefore the use of an outside bar or plate extending along the joint and having more than one bolt hole would be only a waste of metal in so far as this lateral distribution of strains is concerned. We are, therefore, for the first time enabled to provide a joint having a splice bar of I-beam or T-rail proportions with only one bar at each side of the rail. This thin web type of bar is not only the most efficient in stiffness and from the standpoint of economy of metal used, but its thin web also makes the punching of the holes through the web much easier. This punching can in fact be done cold without any possibility of causing fractures to extend into the heavy head and foot portions of the bar.

Our improved bridge plate also has another very important advantage in addition to its function of relieving the web member of the splice bar. The ordinary washers heretofore used to fill in the faces of splice bars and to afford vertical gripping faces for the bolt heads and nuts, are bulky in form and have to be made either of castings and cored out, or from rolled bars which must be drilled, since they are too thick and not of a shape to permit them to be punched.

Our improved bridge plate is of very light construction and can be made from rolled bars by shearing and punching at one operation. The advantage of this from the standpoint of cheapness in manufacturing is apparent. It also has the additional advantage over an ordinary washer fitting the entire outer bolting face of the bar that it cannot transmit horizontal strains to the middle of the web, as is often done by an irregular or bulged portion of a cast washer, or by a collection of dirt or scale on the bar, in all of which cases the even distribution of strains and the perfect fitting of the closely fitting faces is destroyed.

Our invention also includes the use of thin light bridge plates on bars with heavy webs, where the distribution of the strains necessary with the light webs is not necessary, and with the same advantages in cheapness, lightness and facility of manufacture; and with the further advantage that the bar such as shown in Fig. 2 may be constructed which is lighter in weight than the ordinary angle bar and more than twice as stiff.

What we claim is:—

1. In a rail joint, a splice bar having enlarged head and foot portions and a relatively thin web portion all arranged so as to form a substantially shallow concave outer face extending the length of the bar, and separate clamping means at each bolt hole bearing wholly within said concave face and spanning the web, said means tightly clamping the bar horizontally against the rails without springing the web inwardly or spreading the head and foot portions.

2. In a rail joint, a splice bar having enlarged head and foot portions joined by a relatively thin web portion and separate clamping means spanning the web at each bolt hole and bearing on adjacent diverging faces of said head and foot portions, said diverging faces having an included angle greater than the angle included between the planes of the under side of the rail head and the upper side of the rail foot.

3. A rail joint having one splice bar only on each side of the rails, said bars having bolt holes therethrough, and separate clamping means at each bolt hole, having portions to grip the outer faces of the splice bars adjacent to horizontal planes through the top and bottom of the bolt holes, said means also spanning the bar adjacent to a horizontal plane through the middle of the bolt holes.

4. In a rail joint a splice bar having an enlarged head, a thin web and an outwardly extending enlarged foot member fitting the top of the rail base, a portion of the top surface of said foot member lying in a plane between the vertical and the plane of the top surface of the rail base, and clamping means spanning a portion of said web and bearing on said top surface.

5. In a rail joint a splice bar having a web and an outwardly projecting head portion, said head portion having an under face lying in a plane between the vertical and the plane of the under face of the rail head, and separate clamping means at each bolt hole spanning a portion of said web and bearing on said under face of the bar so as to transmit the pulling force of the bolts in lines substantially parallel to the axis of the bolts.

6. In a rail joint, a splice bar having an enlarged head and foot joined by a relatively thin web, said foot having a portion of its upper face lying in a plane between the vertical and the plane of the upper face of the rail base, and clamping means spanning a portion of said web and bearing on said upper face of the foot member, so as to clamp the bar horizontally against the rails without springing the web inwardly or spreading the head and foot portions.

7. In a rail joint, a splice bar having a web joined to a foot member fitting the upper face of the rail base and extending beyond its outer edge, a portion of the top surface of said foot member lying in a plane between the vertical and the plane of the top surface of the rail base, and separate clamping means at each bolt hole spanning a portion of said web and bearing on the top surface of said foot member, so as to transmit the pulling force of the bolts in lines substantially parallel to the axis of the bolts.

8. In a rail joint, a splice bar in the form of an I beam with enlarged head and foot portions, the enlargement at the outer side of the head extending below the horizontal plane at the top of the nuts, and the bar having a relatively thin web portion, said web portion and enlarged head and foot being arranged to form a concave outer face extending the length of the bar, together with separate clamping means at each bolt hole bearing wholly within said concave face and spanning the web of the bar, said means acting to tightly clamp the bar horizontally against the rails without springing the web inwardly or spreading the head and foot portions of the bar.

In testimony whereof, we have hereunto set our hands.

WILLIAM P. THOMSON.
SAMUEL G. THOMSON.

Witnesses:
S. E. PATTERSON,
McLEOD THOMSON.